J. MIZELL & P. H. SESSOMS.
SAD IRON HEATERS.
No. 182,689.   Patented Sept. 26, 1876.
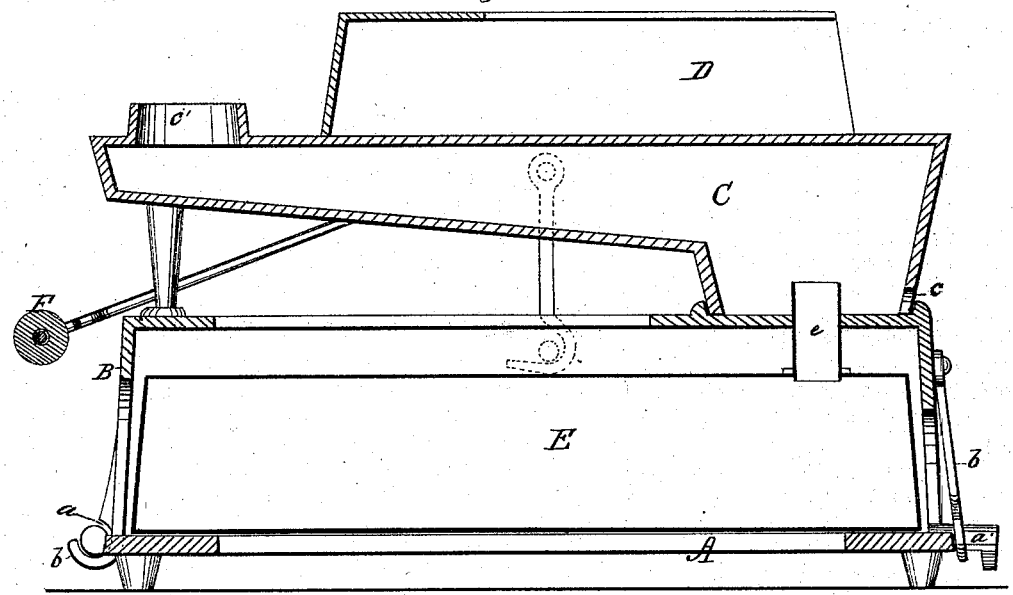
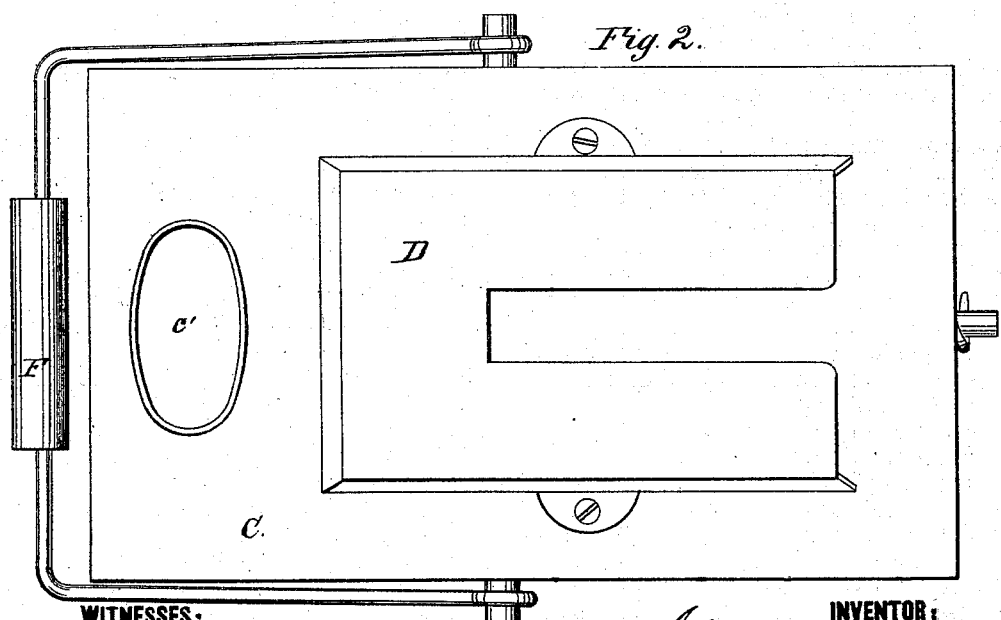

UNITED STATES PATENT OFFICE.

JOSIAH MIZELL AND PRESTON H. SESSOMS, OF COLERAIN, N. C.

IMPROVEMENT IN SAD-IRON HEATERS.

Specification forming part of Letters Patent No. 182,689, dated September 26, 1876; application filed August 29, 1876.

*To all whom it may concern:*

Be it known that we, JOSIAH MIZELL and PRESTON H. SESSOMS, of Colerain, in the county of Bertie and State of North Carolina, have invented a new and Improved Sad-Iron Heater; and we do hereby declare the following to be a full, clear, and exact description of the same, reference being had to the accompanying drawing, forming part of this specification, in which—

Figure 1 represents a vertical longitudinal view of the invention, and Fig. 2 a plan of the same.

The invention consists in attaching a sad-iron receptacle to the top of a combustion-chamber, which rests upon a frame standing over and around a lamp or other suitable heating apparatus, said frame and inclosed lamp being supported by a base-plate. The rear end of the combustion-chamber is a flue, becoming more shallow toward the rear, so as to increase the draft and make the flame pass backward under the receptacle for the irons above.

The lamp-chimneys pass up into the combustion-chamber through openings made to receive them in the bottom of the latter near its front end, the chamber having, in addition, two other openings—one at its lower front edge to admit air; the other on top, near its rear end, for the escape of the products of combustion.

The base-plate, frame, combustion-chamber, and receptacle may be made of cast-iron or other suitable material.

In the accompanying drawing, A represents a rectangular base-plate supporting the frame B and lamp E, of similar shape. At the rear edge of the base-plate are the slots $a\ a$, into which hook the curved ends $b\ b$ of the rear legs of the frame B, forming a hinge-joint. Said frame is provided at its front end with the pivoted hook $b'$, which engages a projection or pin standing out from the front edge of the base-plate. Near the corners of the latter arise projections, which, when the frame is in position, rest against the inner surfaces of its legs, each projection standing within the inner angle of a leg.

E is the lamp or heating apparatus, with its chimneys $e'$ penetrating the combustion-chamber C through openings, which they fit closely, in the bottom of the latter near its front end. The corners of said lamp rest against and are held in place by the projections arising near the corners of the base-plate. Just to the rear of the lamp-chimneys the floor of the combustion-chamber slants abruptly upward and backward to about half the height of said chamber, and then more gradually in the same directions to the rear end, which is about one-third as deep as the front end. The draft through the combustion-chamber is increased by this shape, and the flame drawn backward and under the irons in the receptacle above, thus heating more quickly and to a greater degree the surface of the chamber immediately below said irons, the rear end of the combustion-chamber being from its shape a flue. Said rear end is supported upon the frame B by pillars. At the lower front edge of the chamber C is the opening $c$, for the admission of air, and on top, near the rear end, is the opening $c'$, for the escape of the products of combustion. The latter opening is surrounded by a flange, so that a pipe or chimney may be attached. The deep front end of the chimney rests within a rectangular flange on top of the frame B, and near its middle are pivoted, on each side, hooks that engage staples or pins on the frame. D is the sad-iron receptacle, firmly attached to the top of the combustion-chamber, open at one end to receive the iron, and slotted above to allow the protrusion of the handle of the latter.

The whole device may be moved, when necessary, by means of the bail F.

Having thus described our invention, what we claim as new, and desire to secure by Letters Patent, is—

The sad-iron heater herein described, consisting of a base-plate, hinged frame or stand, combustion-chamber, with its rear end formed into a flue, and receptacle for the sad-iron, all constructed and arranged substantially as shown and described, for the purpose specified.

The above specification of our invention signed by us this 21st day of August, 1876.

JOSIAH MIZELL.
   PRESTON H. SESSOMS.

Witnesses to both signatures:
 WILLIAM E. BAKER,
 S. SAMUEL LEARY.